Patented Sept. 18, 1951

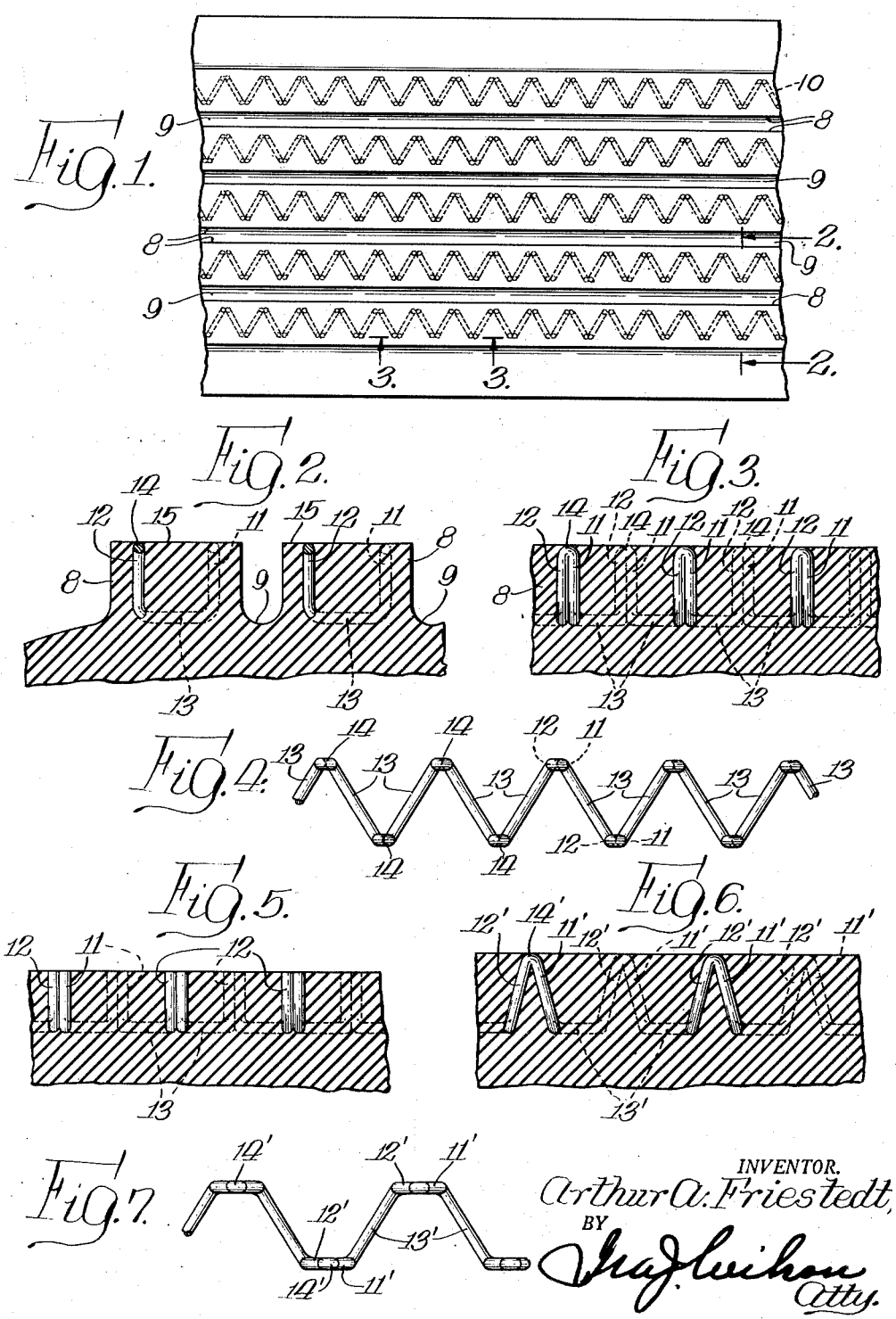

2,568,542

UNITED STATES PATENT OFFICE 2,568,542

NONSKID TIRE

Arthur A. Friestedt, Chicago, Ill.

Application January 10, 1949, Serial No. 70,059

5 Claims. (Cl. 152—211)

The invention pertains to anti-skid devices for natural or synthetic rubber vehicle tires whether of the solid or pneumatic type. More particularly, it relates to metallic elements to be embedded in the tread portion of a tire at the time the tread is put upon the tire originally or when the tire is "recapped."

Various anti-skid constructions for tire treads employing metal elements embedded within the tread body for security of anchorage and having portions at or projecting from the road-contacting surface of the tread for frictional engagement with snow, ice, etc., have been well known and have met with fair success in some forms. However, one of the greatest difficulties encountered in employing such devices has been that of placing the devices within the treads in such manner that they may be effective for their purposes. One of the most successful devices so far employed is a hard steel wire coiled into an open octagonal-sided coil and, in annulus form, embedded within the tread circumferentially of the tire. One of the sides of each octagonal-sided turn of the coil is disposed at or very slightly above or below the road engaging surface of the tire tread so that either immediately upon or shortly after the tire is placed in service the metal coil portions will engage the surface of ice, snow or other slippery material that may cover the road so as to grip the road surface to afford the necessary traction. As and when the engaging coil sides become worn through, the remaining portions or turns of the coils (by this time separated from one another) form sharp ended members which, if they do not become bent or broken off or cast out of the tire tread by centrifugal and other forces, will afford a fair measure of frictional gripping engagement with a snow or ice surface.

Unfortunately however, it has been found, those portions of the coil turns which remain, after the outer or exposed sides have been worn away, do not retain their effectiveness partly, perhaps, because they may become bent into the tire tread and partly because they are readily thrown out of the tire tread under centrifugal and other forces encountered under operating conditions. In any event, the result is loss of traction and eventually the once "non-skid" tire becomes no better than the ordinary tire so far as friction on slippery pavements is concerned. Consequently, although the wire coil formed into an annulus extending completely about the tire circumference and incorporated in the tread as a part thereof, affords one of the most simple, economic and effective methods by which to "arm" a tire tread against slippery road conditions, it generally has a short life and does substantial damage to the tire tread.

One of the principal objects of this invention, therefore, is to provide an anti-skid device, to be embedded in the tread of a tire, of such construction and arrangement that it will have all of the advantageous features, including those of simplicity and ease of incorporation within the tread of the tire, of a continuous coil, but which is not so susceptible to distortion or bending under usual conditions of operation as to render it ineffective or materially to reduce its effectiveness as prior constructions, the improved device also being so formed and embedded in the tire tread that the individual parts or segments thereof (formed by wearing away interconnecting parts) will be retained in the tire tread and serve their functions throughout a substantial portion of the life of the tread.

Another of the principal objects is to provide an automobile or other vehicle tire tread or retreading "camelback" having a novel type of anti-skid device embedded therein in such manner and so disposed that the rubber or other tread material will securely retain the individual parts of the device against being thrown or displaced from the tread or distorted or otherwise rendered ineffective for proper functioning.

Many other objects as well as the advantages and uses thereof will be or should become apparent and understood after reading the following description and claims and after viewing the illustrations of a preferred embodiment shown in the accompanying drawings in which:

Fig. 1 is a plan or developed view of the tread surface of an automobile tire employing the presently preferred embodiment of the invention;

Fig. 2 is a view in radial section of a fragment of the tire tread portion taken substantially along the line 2—2 of Fig. 1 but on an enlarged scale;

Fig. 3 is a view in radial section of a fragment of the tire tread portion along the line 3—3 of Fig. 1 but on the scale of Fig. 2, the section being taken in a plane substantially at right angles to the plane of Fig. 2;

Fig. 4 is an enlarged detail top plan view of a part or length of a non-skid element as it would appear when formed and ready to be incorporated in a tire tread;

Fig. 5 is a view of the tread fragment shown in Fig. 3 after wear has taken place to such an extent that the tread thickness has been reduced and the interconnecting parts of the anti-skid members in the tread have been worn away thereby leaving a continuous series of relatively independent and sharp pointed anti-skid elements to continue their functional purposes; and Figs. 6 and 7, respectively, correspond to the views of Figs. 3 and 4, but show a modified anti-skid member embedded in a tire tread portion and as such member would appear prior to incorporation in the tread.

The tire tread illustrated in Figs. 1, 2 and 3 is arbitrarily shown as having five circumferential lands or ridges 8 separated, one from the other by circumferentially extending grooves 9. In each land or ridge 8, one of the anti-skid devices, generally designated 10, of one form of the invention is embedded throughout the circumferential length thereof. While it is preferred that each land or ridge be equipped with an anti-skid device, the arrangement may be such that any number of the lands less than the total number may be so constructed. The tread portion of the tire, when the latter is originally built or when re-capped may be provided with the anti-skid devices, the devices being positioned within the vulcanizing mold when the unvulcanized rubber and carcass are put in for vulcanization.

Each anti-skid device is formed as a relatively continuous member from a fairly hard (for stiffness) but tough steel wire, such as "bead" wire coated by any of the well known processes with any of the usual coatings adapted to effect a firm bond with the surrounding rubber. Ordinarily the bead wire diameter for passenger car tire use will be 0.054" and for truck tires 0.062" but heavier or lighter gauges of wire may be employed in either use. The forming which may be done by hand or by special machinery, is so performed as to effect a continuous series or succession of U-shaped portions each having a pair of legs 11, 12 extending upwardly in substantially parallel relation to one another and each substantially at right angles to a base part 13 which, preferably, is straight although it may have a slight curve upwardly (convexly upward between the legs) thereby to tend to equalize the pressures directed radially upward against the underlying tread rubber when in use.

The adjacent legs 11 and 12 of adjacent U-portions are disposed substantially together in this form and when first formed and embedded in the tire tread are joined together by a connecting portion 14 of very short radius as will be appreciated. Successive base portions extend alternately from one side of the mid line of the device to the other or zig-zag (viewing the plan thereof in Figs. 1 and 4), at such angle as will stagger the portions or "points" 14 at appropriate intervals, the result being that alternate of the "points" will lie on one side of the median line of the base parts 13 while the intermediate "points" will lie on the other side of such line. The width of the device measured perpendicular to the opposite sides or lines of "points" 14 should be less than the corresponding measurement of a land or ridge 8 since the entire device, except the extreme outer ends of legs 11 and 12, is to be surrounded by a substantial body of rubber as will be apparent from the illustrations.

As an example, assuming that the tire tread to be armored with the non-skid device is for a passenger vehicle and that the tread lands are of a width of 11/32" and a radial depth, from road surface to the bottom of grooves 9, of at least 11/32" then the overall width of the device may be 11/32" and the overall length of the legs measured from the outside of the U-base to the outer ends or "points" 14 may be likewise 11/32" with such angular relation between successive base portions 13 as to space the successive "points" 14 on each side at from 5/16" to 3/8" apart. When the resulting wire form or device is embedded in the tread land or ridges to a depth such that the "points" 14 of adjoining legs are initially just flush with the surface 15, the device will be firmly and securely held in the tire and excellent traction is provided. In the example here given the bases of the U-portions will lie at the level of the root of the tread lands or the bottoms of the grooves 9 yet it is possible that under some conditions of tire composition, manufacture and use, such location might be undesirable. If so, the legs of the devices may be made longer to locate the base portions 13 at a depth below (radially inward of the tire) the bottoms or roots of the lands and grooves or the legs may be made shorter to locate the bases 13 outward (radially) from such bottoms or roots.

When the tire is placed in use the "points" 14 will engage the road surface or will dig into the ice or snow covering the road surface thereby to afford traction, the peculiar form of the device and the wire itself together with the tire rubber or rubber-like substance providing sufficient resilience to absorb shocks and to conform to unevenness so that the tire will "ride" substantially as easily as without the anti-skid devices embedded therein. With a firm bond between the rubber or rubber-like composition of the tire tread and the wire surfaces of the anti-skid devices and by reason of the substantial length of relatively flat base 13 of each of the U-shaped portions, there will be little chance of the anti-skid device being displaced or thrown out of the tire tread even after the "points" 14 have been worn through, thereby separating the anti-skid device into a series of individual units, each of what may be termed a "broad-base staple" in form. When, through wear, the "points" 14 have broken through, the remaining ends of the legs of each U-shaped portion will continue engagement with the road surface to maintain the non-skid function. Since the legs extend substantially radially of the tire they will tend at all times to "bite" into the surface of snow or ice or the like from a direction substantially perpendicular to the general plane of such surface, and the chances of the legs being bent over or bent down into the tread surface in such manner as to reduce their effectiveness are thereby minimized. Fig. 5 illustrates the condition of the device after the "points" 14 have been worn away.

The modified form illustrated in Figs. 6 and 7 differs from the previously described form only in the respect that the legs 11' and 12' are spread slightly from one another so that they incline away from one another from the "points" 14' at the tire tread surface to the relatively flat bases 13', the inclination preferably being only in the direction of the circumference of the tire and at an angle of between ten and twenty degrees. As will be observed from Fig. 7, the legs 11' and 12' extend substantially perpendicular to the base parts 13' relative to any plane of rotation of the tire itself. The manner of functioning of this form will be substantially identical with the manner of function of the previously described form.

While I have illustrated and described a preferred and a modified form of the invention, various changes and other modifications may be made therein without departing from the invention spirit and the scope of the appended claims.

I claim:

1. An anti-skid device to be embedded in the tread portion of a rubber tire for a vehicle, comprising, a length of relatively stiff wire formed into a continuous succession of U-shaped portions with the legs of each intermediate U-portion arranged in juxtaposition and the top ends joined respectively to the top end of the adjacent leg of the preceding and succeeding U-portions, the base part of the U of each U-portion being substantially flat and being directed at an angle less than a straight angle to each of the preceding and succeeding U-portion base parts, alternate base parts being substantially parallel.

2. An anti-skid device to be embedded in the tread portion of a rubber tire for a vehicle, comprising, a length of relatively stiff wire formed into a continuous succession of U-shaped portions with the legs of each intermediate U-portion disposed in juxtaposition and with the top ends of these legs joined respectively to the top end of the adjacent leg of the preceding and succeeding U-portions whereby to present pairs of radially extending projecting ends to the road surface when the portion of the wire joining the top ends of the legs is worn away, the base part of the U of each U-portion being substantially flat and being directed at an angle less than a straight angle to each of the preceding and succeeding U-portion base parts, alternate base parts being substantially parallel, each leg of each U-portion being disposed at an angle of substantially 90° to the base part.

3. In a vehicle tire having a resilient tread portion extending circumferentially thereof, an anti-skid device embedded in said portion and comprising, a length of relatively stiff wire formed into a continuous and connected succession of U-shaped portions with the top ends of the legs of each intermediate U-portion abutting and joined respectively to the top end of the adjacent leg of the preceding and succeeding U-portions to present pairs of sharp pointed anti-skid elements projecting radially outward through the tire tread when the joined portion of the top ends is worn away, the base part of the U of each U-portion being substantially flat and directed at an angle less than a straight angle to each of the preceding and succeeding U-portion base parts, alternate base parts being substantially parallel, the legs of the U-portions being directed substantially radially of the tire and their outer ends being disposed substantially at the tire tread surface.

4. In a vehicle tire having a resilient tread portion extending circumferentially thereof, an anti-skid device embedded in said portion and comprising, a length of relatively stiff wire formed into a substantially continuous and connected succession of U-shaped portions with the top ends of the legs of each intermediate U-portion joined respectively to the top end of the adjacent leg of the preceding and succeeding U-portions, the base part of the U of each U-portion being substantially flat and directed at an angle less than a straight angle to each of the preceding and succeeding U-portion base parts, alternate base parts being substantially parallel, the legs of the U-portions being directed substantially radially of the tire and their outer ends being disposed substantially at the tire tread surface whereby to present a series of pairs of road gripping outer ends arranged in juxtaposition and projecting radially outward through the tread when the connecting top ends of the legs are worn away, adjacent legs of adjacent U-portions being substantially parallel to one another, the base portions being disposed substantially transversely of the tire tread.

5. In a vehicle tire having a resilient tread portion extending circumferentially thereof, and anti-skid means embedded in said tread portion, the anti-skid means comprising a length of wire bent into a succession of U-shaped wire members the legs of which are directed substantially radially of the tire from within the tread to the surface thereof and the base part of the U of each of which is substantially straight and substantially perpendicular to each leg thereof, the axis of each base part extending in a direction generally transverse to the circumference of the tire with adjacent bases directed at an angle less than a straight angle to one another whereby one leg of each member lies on one side of a circumferential line between the legs thereof and the other leg of each such member lies on the other side of said line but circumferentially displaced therefrom to present radially projecting road-gripping ends located in staggered relation.

ARTHUR A. FRIESTEDT.

REFERENCES CITED

The following references are of record in the file of this patent:

UNITED STATES PATENTS

| Number | Name | Date |
|---|---|---|
| 865,288 | Baker | Sept. 3, 1907 |
| 1,111,419 | Wadsworth | Sept. 22, 1914 |
| 2,006,038 | Yamaki | June 25, 1935 |
| 2,132,614 | Gray | Oct. 11, 1938 |